United States Patent
Appel et al.

(10) Patent No.: US 6,492,442 B1
(45) Date of Patent: Dec. 10, 2002

(54) STABILIZER COMPOSITION

(75) Inventors: Manfred Appel, Landau (DE); Hubert Trauth, Dudenhofen (DE); Jürgen Krockenberger, Stuttgart (DE); Alexander Aumüller, Duchess Crest (SG)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/676,985

(22) Filed: Oct. 2, 2000

(30) Foreign Application Priority Data

Oct. 6, 1999 (DE) .......................... 199 48 117

(51) Int. Cl.⁷ ............................................ C08K 5/1575
(52) U.S. Cl. .................. 524/102; 524/110; 525/205; 525/327.6; 526/262
(58) Field of Search ................ 524/102, 110; 525/205, 327.6; 526/262

(56) References Cited

U.S. PATENT DOCUMENTS

| | | | | |
|---|---|---|---|---|
| 4,650,894 A | * | 3/1987 | Fisch et al. | |
| 4,806,580 A | * | 2/1989 | Bock et al. | |
| 4,866,136 A | * | 9/1989 | MacLeay | |
| 4,925,888 A | * | 5/1990 | Ammueller et al. | |
| 5,000,945 A | * | 3/1991 | Kobayashi et al. | |
| 5,342,978 A | * | 8/1994 | Enlow et al. | |
| 5,534,645 A | * | 7/1996 | Quotschalla et al. | |
| 5,710,228 A | | 1/1998 | Krause et al. | |
| 5,807,504 A | | 9/1998 | Krockenberger et al. | |
| 5,821,292 A | | 10/1998 | Aumueller et al. | |

FOREIGN PATENT DOCUMENTS

| | | |
|---|---|---|
| DE | 44 05 670 | 2/1994 |
| DE | 42 39 437 | 5/1994 |
| DE | 44 40 288 | 5/1996 |
| DE | 4440288 A1 * | 5/1996 |

* cited by examiner

*Primary Examiner*—Peter Szekely
(74) *Attorney, Agent, or Firm*—Oblon, Spivak, McClelland, Maier & Neustadt, P.C.

(57) ABSTRACT

Described is a stabilizer composition comprising a 3-arylacrylic ester, a polymeric compound having a molecular weight of at least 2000 which carries, on a polymeric framework, side groups having secondary amine functions, all substituents positioned to the amine nitrogen being other than hydrogen, a chroman derivative, and an organic phosphite and/or phosphonite. The stabilizer composition is particularly suitable for stabilizing thermoplastic polyurethane against light, oxygen and heat.

10 Claims, No Drawings

STABILIZER COMPOSITION

The present invention relates to a stabilizer composition and to its use to stabilize nonliving organic material against the effects of light, oxygen and heat.

The mechanical, chemical and/or aesthetic properties of nonliving organic material, especially plastics and coating materials, are known to be impaired by the effects of light, oxygen and heat. This impairment is normally manifested as yellowing, discoloration, cracking or embrittlement of the material. The purpose of stabilizers or stabilizer compositions is to afford satisfactory protection to counter the deterioration of organic material as a result of light, oxygen and heat.

Sterically hindered amines (Hindered Amine Light Stabilizers; HALS) are known stabilizers against photolytic and thermal decomposition of plastics. Particularly suitable compounds of this kind are oligomeric HALS. For instance, DE-A-4239437 discloses certain maleamide-α-olefin copolymers having tetramethylpiperidyl side groups, which constitute effective stabilizers.

The oligomeric HALS comprise solids. It has been found that the incorporation and homogeneous distribution of these substances in, for example, polymer molding compounds are occasionally difficult.

DE-A-4440288 discloses the use of certain 3-arylacrylic esters as light stabilizers and stabilizers for nonliving organic material. The 3-arylacrylic esters may be used in combination with sterically hindered amines.

DE-A-4405670 relates to a stabilizer mixture comprising chroman derivatives, organic phosphites or phosphonites and amines for stabilizing organic material.

It is an object of the present invention to specify a new stabilizer composition based on oligomeric HALS which is in a form that is easy to incorporate into the material to be stabilized, may be distributed homogeneously and affords a high protective action against the effects of light, oxygen and heat. The stabilizer composition should be particularly effective in the stabilization of polyurethanes.

We have found that this object is achieved in accordance with the invention by means of a stabilizer composition comprising A) at least one 3-arylacrylic ester of the formula I

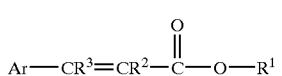

where
Ar is an aryl radical which may carry 1, 2 or 3 substituents selected from $C_{1-4}$ alkyl, $C_{1-4}$ alkoxy, hydroxyl, phenoxy, amino, mono- or di($C_{1-4}$ alkyl) amino, halogen or nitro or may carry a methylenedioxy group,
$R^1$ is $C_1$ to $C_{20}$ alkyl or $C_2$ to $C_{20}$ alkenyl, and
$R^2$ and $R^3$ are hydrogen or $C_1$ to $C_4$ alkyl, B) a polymeric compound having a molecular weight of at least 2000 which carries, on a polymeric framework, side groups having secondary amine functions, all substituents positioned α to the amine nitrogen being other than nitrogen, C) at least one chroman derivative of the formula II

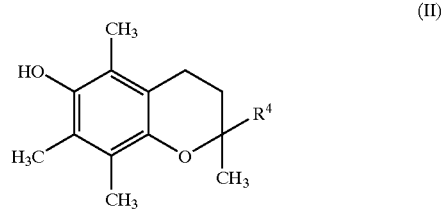

where $R^4$ is a group of the formula

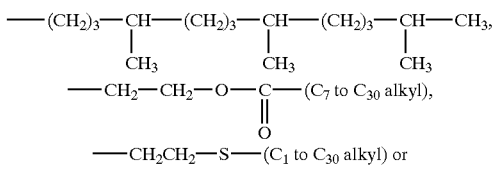

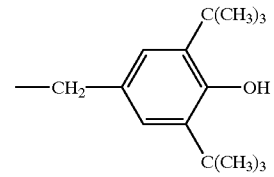

and

D) at least one organic phosphite and/or phosphonite.

The stabilizer composition of the invention is generally a viscous liquid at room temperature and is therefore easy to incorporate into and disperse homogeneously in the material to be stabilized. The stabilizer composition of the invention preferably comprises a viscous liquid having a viscosity in the range from 2600 to 3000 mPas, in particular from 2700 to 2900 mPas, measured at 20° C. and 30 s$^{-1}$ using a Haake Rheowin RS 150 apparatus.

It has also been found that the protective action of the stabilizer composition of the invention against the effects of light, oxygen and heat is higher than to be expected from the contributions of the components of the stabilizer composition. The pronounced protective action of the stabilizer composition of the invention is therefore based on a synergistic effect of the components.

The stabilizer composition of the invention comprises as component A) a 3-arylacrylic ester of formula I.

In formula I, Ar is, for example,
phenyl,
o-, m- or p-tolyl,
o-, m- or p-ethylphenyl,
o-, m- or p-propylphenyl,
m- or p-cumyl,
o-, m- or p-butylphenyl,
m- or p-iso-butylphenyl,
m- or p-sec-butylphenyl,
m- or p-tert-butylphenyl,
2,3-, 2,4-, 2,5-, 2,6-, 3,4- or 3,5-dimethylphenyl, mesityl,
o-, m- or p-methoxyphenyl,
o-, m- or p-ethoxyphenyl,
o-, m- or p-propoxyphenyl,
m- or p-iso-propoxyphenyl,
o-, m- or p-butoxyphenyl,
m- or p-iso-butoxyphenyl, m- or p-sec-butoxyphenyl, m- or p-tert-butoxyphenyl, 2,3-, 2,4-, 2,5-, 2,6-, 3,4- or 3,5-dimethoxyphenyl, o-, m- or p-hydroxyphenyl, 2,3-, 2,4-, 2,5-, 2,6-, 3,4- or 3,5-dihydroxyphenyl, 3-hydroxy-4-methoxyphenyl, m- or p-phenoxyphenyl, o-, m- or p-aminophenyl, o-, m- or p-(N-methylamino)phenyl, o-, m- or p-(N,N-dimethylamino)phenyl, o-, m- or p-fluorophenyl, o-, m- or p-chlorophenyl, 2,4-dichlorophenyl, o-, m- or p-bromophenyl, o-, m- or p-nitrophenyl, 2,3- or 3,4-methylenedioxyphenyl, 2-, 3- or 4-biphenylyl, and α- or β-naphthyl.

Particular preference is given to (C$_1$–C$_4$ alkoxy)phenyl radicals, especially those where the alkoxy radical is in p-position on the phenyl nucleus.

R$^1$ is a straight-chain or branched C$_1$–C$_{20}$ alkyl or C$_2$–C$_{20}$ alkenyl group, e.g., methyl, ethyl, n-propyl, iso-propyl, n-butyl, iso-butyl, sec-butyl, tert-butyl, n-pentyl, iso-pentyl, sec-pentyl, tert-pentyl, neo-pentyl, n-hexyl, n-heptyl, n-octyl, 2-ethylhexyl, n-nonyl, iso-nonyl, n-decyl, n-undecyl, n-dodecyl, n-tridecyl, iso-tridecyl, n-tetradecyl, n-hexadecyl, n-octadecyl, n-eicosyl, vinyl, allyl, methallyl, oleyl, linolyl and linolenyl. Of these, straight-chain or branched C$_5$ to C$_{16}$ alkyl groups, especially straight-chain or branched C$_8$ to C$_{12}$ alkyl groups, are preferred. Of particular interest are straight-chain or branched C$_8$ alkyl groups.

A particularly preferred 3-arylacrylic ester of the formula I is 2-ethylhexyl p-methoxycinnamate.

The stabilizer composition of the invention comprises as component B) a polymeric compound having a molecular weight of at least 2000, in particular from 2300 to 50,000, which on a polymeric framework carries side groups having secondary amine functions, all substituents positioned a to the amine nitrogen atom being other than hydrogen and being, for example, C$_1$–C$_4$ alkyl radicals, especially methyl groups. The compound suitable as component B) is composed, accordingly, of successive repeating units, each repeating unit having a polymer framework moiety and at least one side group having at least one secondary amine function, all substituents positioned a to the amine nitrogen atom being other than hydrogen. The repeating unit may comprise further side groups which improve, for example, compatibility with the organic material to be stabilized. In general, component B) comprises from 5 to 100, preferably from 6 to 60, repeating units.

Components B) advantageously comprise maleic anhydride (co)polymers comprising, for example, from 0 to 90 mol % C$_2$–C$_{30}$ α-olefin units and from 10 to 100 mol % maleic anhydride units, some or all—for example, more than 92 mol %—of the maleic anhydride units being imidated with 4-amino-2,2,6,6-tetramethylpiperidine.

With particular preference, component B) comprises a maleic acid-α-olefin copolymer comprising structural units of the formula III

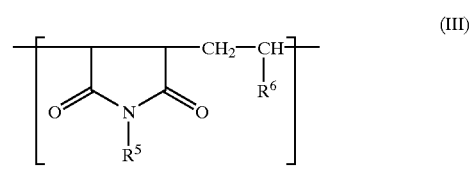

where at least 92 mol % of the radicals R$^5$ are a tetramethylpiperidyl radical of the formula IV

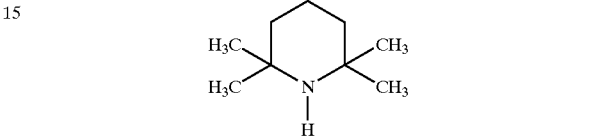

and up to 8 mol % of the radicals R$^5$ are hydrogen, C$_1$–C$_{22}$ alkyl or C$_5$–C$_8$ cycloalkyl, and R$^6$ is C$_{14}$–C$_{28}$ alkyl, preferably C$_{16}$–C$_{24}$ alkyl, especially C$_{18}$–C$_{22}$ alkyl.

The radical R$^6$ is preferably a mixture of C$_{14}$–C$_{28}$ alkyl groups, preferably C$_{16}$–C$_{24}$ alkyl groups, especially C$_{18}$–C$_{22}$ alkyl groups. The plot of the molar fraction of the alkyl groups having a given carbon number as a proportion of the total number of all radicals R$^6$ in the copolymer molecules of a sample against the carbon number comprises preferably at least two maxima, each accounting for at least 30, preferably at least 40 mol %, and the carbon numbers assigned to these maxima differing by one or, preferably two, carbon atoms. The mixtures in question are, in particular, mixtures of octadecyl, eicosyl and docosyl, of which two of these groups, differing by two carbon atoms, account for more than 40 mol % and the third group for from 3 to 19 mol % of the mixture of the radicals R.

The copolymers of the formula III may be prepared by a process in which alternating maleic anhydride-α-olefin copolymers are reacted with 4-amino-2,2,6,6-tetramethylpiperidine and, if desired, up to 8 mol %, based on the copolymer, of ammonia, C$_1$–C$_{22}$ alkylamine or C$_5$–C$_8$ cycloalkylamine in an organic solvent at from 100 to 220° C. Suitable organic solvents include, in particular, aromatic hydrocarbons, such as toluene, xylenes or mesitylene and halo- or nitrohydrocarbons, such as chlorobenzene, dichlorobenzenes or nitrobenzenes. The water formed in the reaction may judiciously be distilled off azeotropically. The maleic anhydride-α-olefin copolymers used as starting material are obtainable by copolymerizing maleic anhydride with α-olefins or α-olefin mixtures, in accordance, for example, with Houben-Weyl, Methoden der Organischen Chemie, volume E20/2, pp. 1237–1248 (1987). With regard to preferred compounds suitable as component B), reference is made to DE-A-4239437 in its entirety.

The stabilizer composition of the invention comprises as component C) at least one chroman derivative of the formula II. Particularly suitable in this respect is 2,5,7,8-tetramethyl-2-(2'-stearoyloxyethyl)chroman (R$^4$=—CH$_2$CH$_2$—O—CO—C$_{17}$H$_{35}$) and, in particular, α-tocopherols, preferably DL-α-tocopherol (R$^4$=—(CH$_2$)$_3$—CH(CH$_3$)—(CH$_2$)$_3$—CH(CH$_3$)—(CH$_2$)$_3$—C(CH$_3$)$_2$).

The stabilizer composition of the invention comprises as component D) at least one organic phosphite and/or phosphonite.

Particularly suitable in this respect are organic phosphites of the formula V

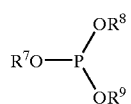

where the radicals $R^7$ to $R^9$ are each $C_2$ to $C_{12}$ alkyl, preferably $C_6$ to $C_{11}$ alkyl, especially C8 to $C_{10}$ alkyl, or $C_6$ to $C_{18}$ aryl, preferably phenyl, which may be substituted by $C_1$ to $C_{18}$ alkyl groups, preferably from one to three $C_4$ to $C_{12}$ alkyl groups, or an organic phosphonite of the formula VI

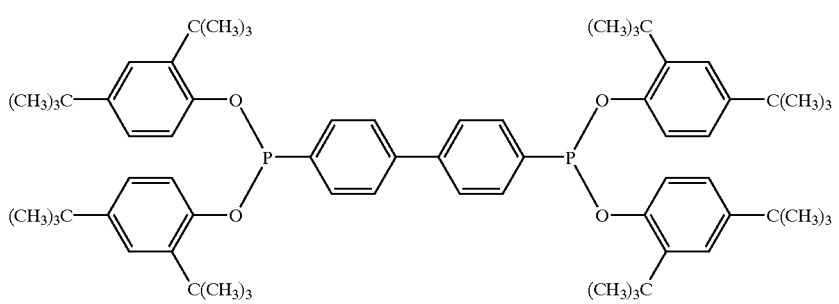

or mixtures of the phosphites V and the phosphonite VI.

Examples of phosphites of the formula V are the following:

trisalkyl phosphites having preferably long-chain linear or branched alkyl groups such as octyl, nonyl, isononyl, decyl or isodecyl groups;

triaryl phosphites having unsubstituted or mono- to trialkyl-substituted aryl groups such as phenyl, nonylphenyl or 2,4-di-tert-butylphenyl groups;

mixed aryl alkyl phosphites, such as diisodecyl phenyl phosphite or diphenyl pentaerithrityl diphosphite.

The phosphonite of the formula VI is available commercially under the name Irgafos® P-EPQ from Ciba-Geigy.

Optionally, the stabilizer composition of the invention further comprises at least one primary, secondary or tertiary monoamine, e.g., of the formula $N(R^{10})(R^{11})(R^{12})$, where $R^{10}$, $R^{11}$ and $R^{12}$ each independently are hydrogen or $C_1$ to $C_{18}$alkyl which may be substituted by up to 5 nonadjacent oxygen atoms or groups of the formula —$NR^{13}$—and/or substituted by 1, 2 or 3 hydroxyl groups, $R^{13}$ being hydrogen or $C_1$–$C_4$ alkyl, or phenyl, which may be substituted by 1, 2 or 3 $C_4$–$C_{18}$ alkyl groups, with the proviso that $R^{10}$, $R^1$ and $R^{12}$ are not simultaneously hydrogen.

Examples of such amines that may be mentioned include the following: butylamine, dibutylamine, tributylamine, tripropylamine, triisopropylamine, octylamine, diisobutylamine, and stearylamine.

Preference is further given to amines having hydroxyl-containing radicals, e.g., ethanolamine, diethanolamine, triethanolamine, propanolamine, dipropanolamine, tripropanolamine, 15 isopropanolamine, diisopropanolamine, and, especially, triisopropanolamine.

The stabilizer composition of the invention generally comprises from 30 to 40 parts by weight, preferably from 32 to 35 parts by weight of A), from 30 to 40 parts by weight, preferably from 32 to 35 parts by weight of B), rom 2 to 4 parts by weight, preferably from 2.5 to 3.5 parts by weight of C), and from 25 to 35 parts by weight, preferably from 28 to 32 parts by weight of D).

If a primary, secondary or tertiary amine is included, it is preferably used in an amount of from 0.02 to 0.5, preferably from 0.04 to 0.2 part by weight.

The stabilizer composition of the invention is added to the organic material to be stabilized in a concentration of generally from 0.05 to 5% by weight, preferably from 0.01 to 2% by weight, in particular from 0.05 to 1% by weight, based on the organic material, prior to, during or after its production.

By nonliving organic material is meant, for example, cosmetic preparations, such as ointments and lotions, drug formulations, such as pills and suppositories, photographic recording materials, especially photographic emulsions, intermediates for plastics and coating compositions, but especially coating compositions and plastics themselves.

Plastics which may be stabilized by the stabilizer mixture of the invention are, for example, the following:

polymers of mono- and diolefins, such as low or high density polyethylene, polypropylene, linear poly-1-butene, polyisoprene, polybutadiene, and copolymers of mono- or diolefins or mixtures of said polymers;

polystyrene and copolymers of styrene or α-methylstyrene with dienes and/or acrylic derivatives, such as styrene-butadiene, styrene-acrylonitrile (SAN), styrene-ethyl methacrylate, styrene-butadiene-ethyl acrylate, styrene-acrylonitrile-methacrylate, acrylonitrile-butadiene-styrene (ABS) or methyl methacrylate-butadiene-styrene (MBS); halogenated polymers, such as polyvinyl chloride, polyvinyl fluoride, polyvinylidene fluoride and copolymers thereof;

polymers derived from α,β-unsaturated acids and their derivatives, such as polyacrylates, polymethacrylates, polyacrylamides and polyacrylonitriles;

polymers derived from unsaturated alcohols and amines and/or from their acrylic derivatives or acetals, examples being polyvinyl alcohol and polyvinyl acetate;

polyurethanes, polyamides, polyureas, polyphenylene ethers, polyesters, polycarbonates, polysulfones, polyether sulfones and polyether ketones.

The coating materials which may be stabilized with the stabilizer composition of the invention include paints, such as alkyd resin paints, emulsion paints, epoxy resin paints, polyurethane paints, acrylic resin paints, cellulose nitrate lacquers, or glazes, such as wood preservative glazes.

The stabilizer composition of the invention is particularly suitable for stabilizing polyurethanes, especially thermoplastic polyurethanes. These are predominantly linear polyurethanes obtained starting from diisocyanates, such as 4,4'-diisocyanatodiphenylmethane, and long-chain diols, such as polytetrahydrofuran or polyester polyols. The general procedure is to start from corresponding prepolymers and to use short-chain diols or diamines as chain extenders; the products obtained have a segmented composition, the soft segments having, for example, molecular masses of from 1000 to 3000 and being physically crosslinked by the hard segments.

The stabilizer composition of the invention may also be prepared in the form of a masterbatch, which comprises said composition in a concentration, for example, of from 2.5 to 25% by weight, and may be added in this form to the materials to be stabilized.

The invention is illustrated with the following examples.

EXAMPLE 1

A mixture was prepared from 100 parts by weight of 2-ethylhexyl p-methoxycinnamate, 100 parts by weight of an alternating N-(2,2,6,6-tetramethyl-4-piperidyl)maleimide-$C_{20}$–$C_{24}$-α-olefin copolymer having an average molecular weight of about 2500, 9 parts by weight of DL-α-tocopherol, 90.5 parts by weight of trisnonylphenyl phosphite, and 0.5 part by weight of triisopropanolamine.

A viscous liquid was obtained, having a viscosity of 2876 mPas at 20° C. and 30 $s^{-1}$.

EXAMPLE 2 (COMPARATIVE EXAMPLE)

A mixture was prepared from 100 parts by weight of 2-ethylhexyl β-methoxycinnamate, 100 parts by weight of an oligomeric HALS of the formula below 9 parts by weight of DL-α-tocopherol, 90.5 parts by weight of trisnonylphenyl phosphite, and 0.5 part by weight of triisopropanolamine.

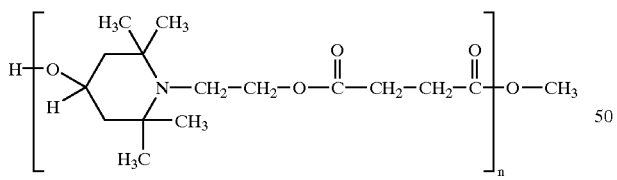

The mixture shows a gellike behavior. A flowable liquid was not obtained. The gellike mixture is unsuitable for homogeneous incorporation into a polymer melt using an extruder.

EXAMPLE 3

Testing of the Stabilizer Effect

Thermoplastic polyurethane (Desmopan®, Bayer) was melted and shaped in an injection molding machine to test specimens measuring 60×45×2 mm.

0.6% by weight of the stabilizer composition of Example 1 was incorporated into one sample. A commercially customary stabilizer composition in the same amount was used as the comparison, consisting of:

0.3% by weight Tinuvin® P (2-(2-hydroxy-5-methylphenyl)-2H-benzotriazole), 0.3% by weight of an oligomeric HALS of the formula shown in Example 2, 0.2% by weight of Irganox® 1010 (sterically hindered phenol).

A sample without stabilizer was used as the control.

The test specimens were weathered in accordance with Xenotest 1200 (DIN 53 387) and subsequently the yellowness index was measured. The results are indicated in the table below.

|  | 0 days | 7 days | 14 days |
|---|---|---|---|
| Unstabilized | 13 | 49 | 58 |
| Comparative | 12 | 29 | 35 |
| Example 1 | 11 | 22 | 31 |

The sample stabilized with the stabilizer composition of the invention, after 7 and 14 days of weathering in the Xenotest, shows distinctly less yellowing than the unstabilized sample and the sample stabilized with the comparative composition.

We claim:

1. A stabilizer composition comprising

A) at least one 3-arylacrylic ester of the formula I

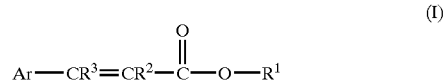

where

Ar is an aryl radical which may additionally carry 1, 2 or 3 substituents selected from $C_{1-4}$ alkyl, $C_{1-4}$ alkoxy, hydroxyl, phenoxy, amino, mono- or di($C_{1-4}$ alkyl)amino, halogen or nitro or may carry a methylenedioxy group, $R^1$ is $C_1$ to $C_{20}$ alkyl or $C_2$ to $C_{20}$ alkenyl, and $R^2$ and $R^3$ are hydrogen or $C_1$ to $C_4$ alkyl, B) a polymeric compound having which carries, on a polymeric framework, side groups having secondary amine functions, wherein all substituents positioned α to the amine nitrogen being other than hydrogen, and wherein the polymeric compound comprises from 5 to 100 repeating units, C) at least one chroman derivative of the formula II

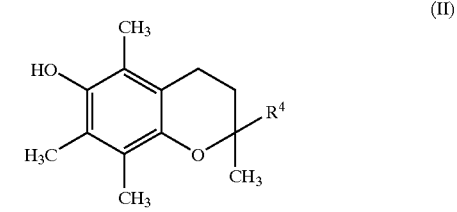

where $R^4$ is a group of the formula

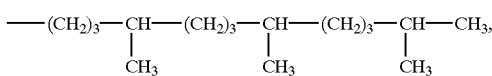

-continued

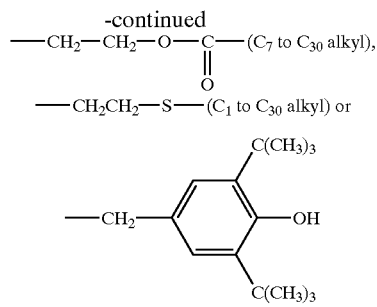

and

D) at least one organic phosphite and/or phosphonite.

2. A composition as claimed in claim 1, wherein Ar is a ($C_1$–$C_4$ alkoxy)phenyl radical.

3. A composition as claimed in claim 1, wherein $R^1$ is $C_5$–$C_{16}$ alkyl.

4. A composition as claimed in claim 1, wherein said polymeric compound B) comprises a maleic acid-α-olefin copolymer comprising structural units of the formula III

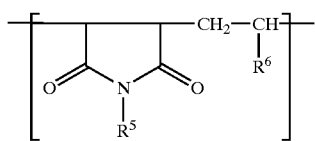

in which at least 92 mol % of the radicals $R^5$ are a tetramethylpiperidyl radical of the formula IV

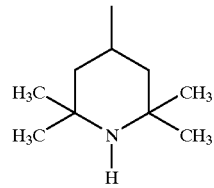

and up to 8 mol % of the radicals $R^5$ are hydrogen, $C_1$–$C_{22}$ alkyl or $C_5$–$C_8$ cycloalkyl, and $R^6$ is $C_{14}$–$C_{28}$ alkyl.

5. A composition as claimed in claim 1, further comprising at least one primary, secondary or tertiary amine.

6. A composition as claimed in claim 1, having a viscosity at 20° C. and 30 $s^{-1}$ in a range from 2600 to 3000 mpas.

7. A method for stabilizing nonliving organic material against the effects of light, oxygen and heat by adding thereto an effective amount of a composition as claimed in claim 1.

8. The method as claimed in claim 7 wherein the organic material to be stabilized is selected from plastics.

9. The method as claimed in claim 8 wherein the plastics are polyurethanes.

10. A thermoplastic molding compound comprising at least one thermoplastic polyurethane and a composition as claimed in claim 1.

* * * * *